INVENTORS
WALTER B. LASHAR
RICHARD F. WARREN JR.
BY
ATTORNEY

INVENTOR
WALTER B. LASHAR
BY RICHARD F. WARREN JR.
ATTORNEY

Patented Oct. 2, 1945

2,385,870

UNITED STATES PATENT OFFICE 2,385,870

CUSHION

Walter B. Lashar, Fairfield, and Richard F. Warren, Jr., Stratford, Conn.

Application February 18, 1941, Serial No. 379,410

4 Claims. (Cl. 5—356)

This invention relates to new and useful improvements in mattresses, cushions, pads, pillows, and the like.

The objects and advantages of the invention will become apparent from a consideration of the following detailed description taken in connection with the accompanying drawings wherein satisfactory embodiments of the invention are shown. However, it is to be understood that the invention is not limited to the details disclosed but includes all such variations and modifications as fall within the spirit of the invention and the scope of the appended claims.

In the drawings—

Figure 1:
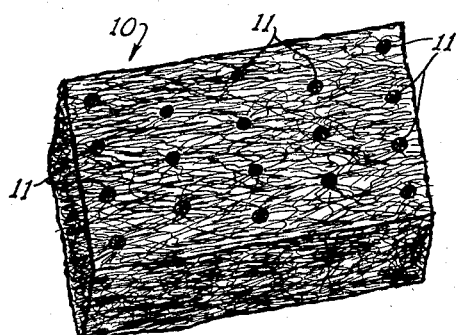
Fig. 1 is a perspective view showing a pad or cushion made in accordance with the invention.
Figure 2:
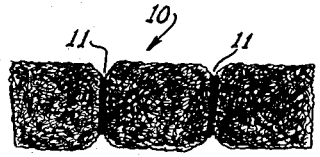
Fig. 2 is a detailed sectional view through a portion of the cushion of Fig. 1.

Referring in detail to the drawings and at first particularly to Figs. 1 and 2 at 10 is generally indicated a pad or cushion comprising a mass of curled or crimped threads of a thermo plastic material preferably vinylidene chloride. In making threads for our present purpose the vinylidene chloride as it is extruded may be passed spirally about a mandrel or the like or the threads may be drawn sharply over an edge whereby to curl or crimp them. In the following specification and claims the condition of the threads is described as crimped although it will be understood that such description is intended to cover all kinds or types of curling of the threads.

The plastic threads described are of a predetermined uniform diameter whereby to provide for the making of a pad or cushion of the desired softness. After the threads are shaped to form the pad or cushion hot needles or needle-like means are passed through the pad or cushion at spaced points 11. The needles are simply passed through the pad and then withdrawn and the hot needles soften the threads with which they contact and cause the adjacent threads along the path of the needles to adhere or fuse or weld together. In this way the pad or cushion is tufted. These needles may be solid or coated with any non-catalysing metal as nickle, magnesium, or monel metal.

Tufting of the pad or cushion as at 11 serves to secure it in fixed shape. After the tufting operation has been completed the edges of the pad may be shaped as desired. In the drawing the edges of the pad or cushion are shown as relatively straight or square and this may be accomplished by shearing with a sharp instrument or by means of a hot wire or the like. When a hot wire is used the threads at the surfaces of the edges of the pad or cushion are fused to one another thus serving further to secure the pad or cushion in the desired shape.

Figure 3:
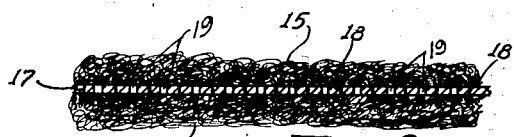
Fig. 3 is a sectional view showing a modified construction.
Figure 4:
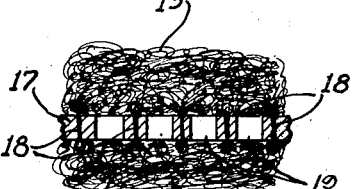
Fig. 4 is an enlarged detailed sectional view of a portion of the cushion of Fig. 3.

Figs. 3 and 4 show a modified construction of pad or cushion wherein layers of cushioning material 15 and 16 are disposed against the upper and lower sides of a sheet 17. Sheet 17 may be of impregnated card board, manila paper or the like but as shown is of vinylidene chloride and the padding 15 and 16 is of threads of the same material. The sheet may be a one piece structure or it may be woven of threads, or it may be of interlaced strips or the like.

The padding 15 and 16 is co-extensive with the sheet 17 and is secured thereto as portions of the padding have been forced through the sheet as shown at 18 in Figs. 3 and 4. To accomplish this attaching of the pads to the sheet heavy spikes or needles are forced through the pads from opposite sides of the sheet and carry portions of the pad forming threads through the sheet. Thereafter as the spikes or needles are withdrawn the tendency of the sheet is to close the holes about the projected portions of the threads and hold them and thus the pads.

Figure 8:
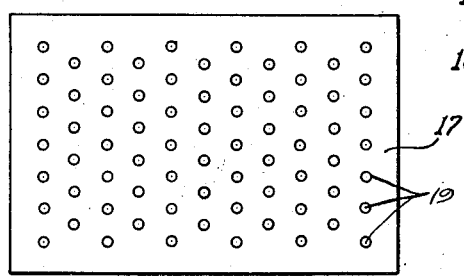
Fig. 8 is a plan view of a sheet used in the pads of Figs. 3 through 7.

This means of applying the pads to the sheets may be described as "Garnetting" since the needles for this purpose are mounted on a board or the like and a number of them forced through the pads and sheets at one time. The tendency of the sheet to close about the threads and the looped portions of the threads which have been forced through the sheet insures that the pads are securely attached to the sheet. For the purpose of ventilation portions of the sheet are removed intermediate its edges whereby to provide perforations 19. The removed perforated sheet 17 is shown in Fig. 8.

Figure 5:
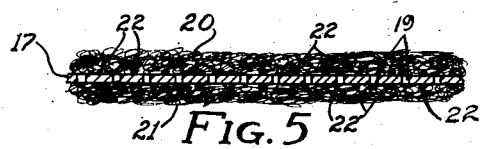
Figs. 5, 6 and 7 are views similar to Fig. 3 but showing further modifications.

Fig. 5 shows another modification wherein pads 20 and 21 are secured to or against the top and bottom sides of the sheet 17. In such figure the pads at spaced points 22 have been fused or welded to the sheet as by passing rods through the inner portions of the pads and electrically heating the rods and using the hot rods to press portions of the threads of the pads against the sheet. In this way, the sheet being preferably thermoplastic and the threads of the pads being thermoplastic the adjacent portions of the threads and the sheet are softened by the hot rods and when the rods are withdrawn or cool the threads and the sheet again set with portions of the threads fused or welded to the sheet. Thus in Fig. 5 the pads are secured to the sheet along lines as indicated at 22. These rods are of the non catalysing metal as above suggested for the needles used in making the pad of Fig. 1.

Figure 6:
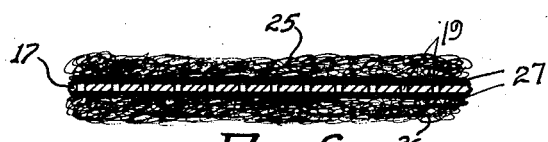

Fig. 6 shows another modification wherein the sheet 17 has pads 25 and 26 secured against its opposite sides. In this modification the pads are applied to the sheet while the latter is heated at least in its surface portions and preferably also the portions of the pads which are applied to the sheet are heated at the time of application. Thus as the heated portions of the pads are pressed against the heated surfaces of the sheet the pads are fused or welded to the sheet as at 27.

Figure 7:

In the modification of Fig. 7 the pads 30 and 31 are cemented to the opposite sides of the sheet. For this purpose sulphonated rubber or other cement 32 is applied to the surfaces of the sheet or to the sides of the pads and then the pads are pressed against the sheet with the cement against the pads and the sheet. When the cement sets the pads are securely attached to the sheet. In each of the modifications described the pads are at least substantially co-extensive with the sheet 17 and are secured to the sheet in such manner as not to become loosened therefrom on contact with moisture. The sheets maintain the pads in shape and prevent bunching of the threads into a ball when the pads are used as in pillows, seat cushions, and the like.

Figure 9:
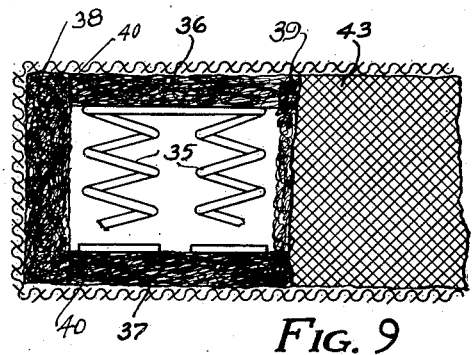
Fig. 9 is a view partly in side elevation and partly in section showing a portion of an inner spring mattress made in accordance with the invention.
Figure 10:
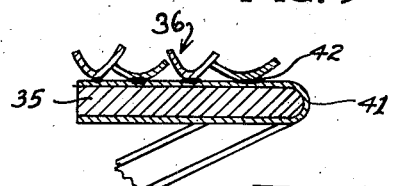
Fig. 10 is a greatly enlarged detailed sectional view showing the manner of securing the pads of Fig. 9 to the inner springs of that figure.

Figs. 9 and 10 show the invention as incorporated in an inner spring mattress. In such figures the coil springs, which may be any or the usual springs employed in mattresses, are designated 35 and disposed against the upper and lower sides of said springs are pads 36 and 37 respectively. These pads are of threads of the materials above mentioned and are of any desired thickness, etc. About the sides or edges of the mattress are other pads 38 and 39. Pads 38 and 39 are held in place by being fused by heat to the edges of the pads 36 and 37 as at 40. If desired the pads may be cemented together at 40 but it is at present preferred that they be heated in these adjacent portions and then pressed together whereby portions of the threads of one become fused to portions of the threads of the others as the heat is dissipated.

Preferably the springs 35 are coated as at 41 with a rather heavy film of a thermo-plastic as the vinylidene chloride above mentioned. This film prevents direct contact between the metal springs and the fine threads of the cushioning pads 36 and 37 whereby cutting of such threads is prevented. In addition the mentioned coating or film 41 provides a base to which portions of the threads of the top and bottom pads 36 and 37 are fused as shown at 42 in Fig. 10.

About the mattress is a cover 43 preferably woven from threads of vinylidene chloride which is fireproof and has many other advantages as applied to the present purpose. This same type or kind of covering may be applied to any of the various modifications of the invention and in fact the pads and cushions may be used with any desired kind or type of covering. Cover 43 may be of any type as a slip cover and is of course of a shape and size for the purpose intended. For example, it may be a slip cover for automobile seats or the like.

The metal for the springs 35 is preferably first coated with a non-catalysing metal, as one of those listed above. Thereafter the coating 41 is applied as by extrusion and then the wire coiled into the spring. The coating 41 prevents the spring coils nicking one another and also provides a smooth slick surface between them whereby the coils will readily slip on one another and will not become locked together and then suddenly release. Also the coating is very abrasive resistant and protects the springs against the weather and in addition acts as a vibration dampener.

Figures 11, 12:
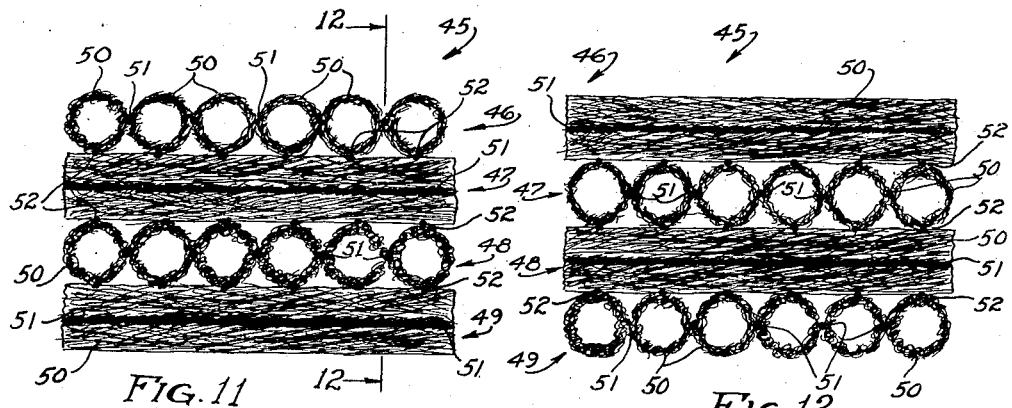
Fig. 11 is a detail sectional view showing a further construction of pad or cushion.
Fig. 12 is a sectional view taken as along the line 12—12 of Fig. 11.

Referring now to Figs. 11 and 12, at 45 is generally indicated a cushion made up of layers 46, 47, 48 and 49 of which each layer comprises the desired size and number of tubes 50. Tubes 50 are here shown as all of the same diameter and wall-thickness although it will be understood that this particular arrangement is not necessary. It will further be understood that while four layers of the tubes are shown this is not a limiting feature as the cushion may comprise one or more layers of the tube depending on the cushion desired. The tightness with which the fibres are formed into the walls and the thickness of the walls are also factors in the springiness of the resulting cushion. In this connection care should be taken in forming the tubes so as to prevent straightening of crimped or curly fibres.

Preferably the tubes of alternate layers are arranged at angles to one another, as for example, right angles. Each tube is made up of threads or fibres of a thermo-plastic, as the vinylidene chloride above mentioned and the tubes may be formed in any desired manner. In order that the tubes will remain in place in the cushion the tubes of each layer are connected to one another as at 51. While the individual tubes of one layer are connected with those of the adjacent layer as at 52. These connections are made by heating the adjacent or engaging portions of the tubes whereby some of the threads or fibres are softened or melted and run together so that on cooling portions of the tubes are welded or fused to one another. During the application of the heat the heated and engaging tube portions are preferably also pressed into contacting relation and when the heating is being accomplished by electrically heated rods or the like the pressure may be maintained until the fibrous material of the tubes cools.

Figures 13, 14:
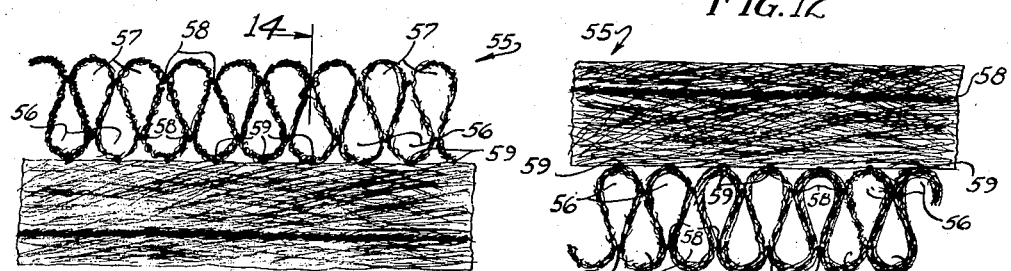
Fig. 13 is a view similar to Fig. 11 but showing another modification.
Fig. 14 is a sectional view taken as along the line 14—14 of Fig. 13.

Referring now to Figs. 13 and 14 the cushion there generally designated 55 is shown as made up of two layers of material which have been folded or bent back and forth upon themselves to form alternately inner and outer loops 56 and 57. The loops of each layer are secured together where they contact as at 58 and the layers are arranged at angles to one another, as, for example, right angles and where the layers engage or contact one another they are secured together as at 59.

Each of the layers is made up of one or more sheets formed of threads or fibres of any of the materials above referred to and the loops are secured to one another and the layers to one another preferably through the application of heat or heat and pressure in the manner and for the purpose stated when considering Figs. 11 and 12. Obviously the pad 55 need not comprise the two layers of material as disclosed but may comprise one or more layers as desired and each layer may comprise a sheet of the desired thickness and the loops of the desired size.

Figure 15:
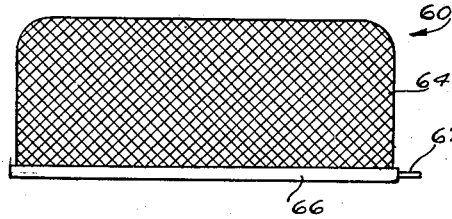
Fig. 15 is a side elevational view of a seat or cushion made in accordance with the invention.
Figure 16:
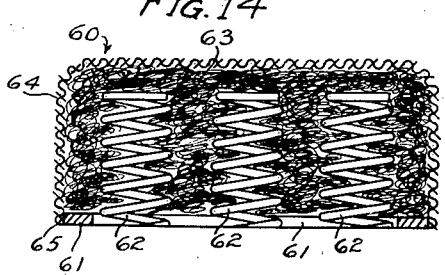
Fig. 16 is a sectional view through the seat or cushion of Fig. 15.
Figure 17:
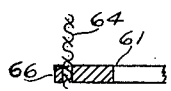
Fig. 17 is a detail sectional view on an enlarged scale showing the method of securing the cover of Figs. 15 and 16 to the frame of that Fig. 16.

Figs. 15, 16 and 17 disclose a completed cushion and the manner of securing the cover of such cushion in place. In such figures the cushion is generally designated 60 and comprise a metal frame 61 and coil springs 62 enclosed by padding 63 comprising fibres or threads of vinylidene chloride.

Disposed over said padding is a woven or other cover 64 also made up of threads of vinylidene chloride or other fire-proof material. Said covering 64 has its lower edge portion 65 disposed against the outer edge of the frame 61 and secured thereto. The securing of the cover to the frame is accomplished through the application of heat and pressure applied as through a band-like heating element 66 which may be electrically heated as through the leads 67. The material of the cover being thermo-plastic when the proper heat is applied the engaged portion of the cover is softened and is pressed against the frame 61 and then when it cools or sets is welded to such frame.

If desired the cover might also be secured to portions of the padding 63 and the latter may be secured to the top of the springs 62 in a manner described in considering Figs. 9 and 10. However, it is desired that the cover be not secured to the padding as the cover may then be readily removed by tearing it loose from the frame and a new cover applied. Obviously after the cover 65 has been secured to the frame 61 the heating element 66 is removed.

Figure 18:
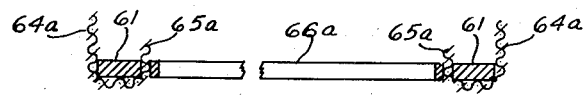
Fig. 18 is a view similar to Fig. 17 but showing a modification.

Fig. 18 shows a slightly different arrangement wherein the cover 64a has its free edges 65a carried inwardly against the inner edges of the frame 61. Thereafter the heating element 66a is expanded against such edge portions of the cover and heats and forces the same against the inner edge of the frame to become fused or welded and thus securely attached thereto when the thermo-plastic material of the cover cools and sets. With this particular construction the edge portions of the cover are concealed and to some extent protected.

While the threads forming the pads or cushions have been described as being of a thermo-plastic, preferably vinylidene chloride, it is to be understood that they may be made of other materials. The vinylidene chloride (sold commercially as Venalloy) is a very satisfactory material for our purpose as it is fire-proof, fungus, germ, vermin and moth proof, will not rot, is not adversely affected by tropical climate, can be easily disinfected and sterilized and is not soluble in antiseptic solutions. In addition it will not pack or mat especially in humid atmospheres and quickly returns to normal when released following compression. When repeatedly compressed and released it does not break into small pieces and being an artificial material preferably extruded into threads there are no portions of larger diameter or increased stiffness such as occur in natural fibres.

Many of the attributes above mentioned are to be found in plastics resulting from or formed by the copolymerization of vinyl chloride and vinyl acetate (sold as "Vinyon"). The addition of the vinyl acetate to the vinyl chloride is necessary to render the mass flexible or pliable although the higher the chloride content of the mass the more nearly fire proof the resulting threads.

With the vinylidene chloride first mentioned the product when subject to intense heat (as flame) gives off chlorine gas thus smothering the match or other burning object applied to it, as, for example, a burning cigarette. Rubber hydrochloride, chlorinated rubber, polychloroprene and naphthalene chloride may be used in place of the vinylidene chloride and has many of the attributes above considered. While thermo-plastic materials generally may be used for our purpose those containing the chloride or other radical having the property of reducing flammability or combustion are preferred since they are more likely to be fire proof.

For less expensive pads or cushions various threads may be impregnated or coated with chlorinated rubber, naphthalene chloride, rubber hydrochloride, polychloroprene, or other materials having the desired characteristics. For example, sissal, hair, cotton threads, kapok, hemp, jute and the like as well as straw and grasses may be impregnated or coated with any of the plastic materials named. Prior to impregnation certain of the threads will be curled or crimped while others will be curled or crimped only following impregnation.

The chlorinated rubber, naphthalene chloride, or other materials will serve to render the threads water resistant, germ and vermin resistant, fire resistant and the like. Further such impregnation will increase the life of the material as by increasing its springiness. The naphthalene chloride is applied while hot or when in solution and the chlorinated rubber only in solution. These fibres or threads are fabricated into cushions as by being fused or welded together as above described. The chlorinated rubber, rubber hydrochloride, polychloroprene, naphthalene chloride and vinylidene chloride all contain the chlorine radical which is freed on heating and prevents flammability.

Other impregnating agents such as rubber latex mixed with emulsified rubber hydrochloride or latex with or without vulcanizing or accelerating agents may be used. For the present purpose the rubber hydrochloride is emulsified with any suitable agent as ammonia and then mechanically mixed with the latex or the latex and rubber hydrochloride may be emulsified together. The main idea is to get the chloride or other radical reducing flammability and combustion into the latex to give or impart to the latter fire proof properties.

The mixture may be extruded into threads and the latter coagulated in any desired manner. However, if the threads are bunched as they are extruded they will mat together as they dry and so hold one another in position in a cushion. Where coagulated threads are used to form the cushion they may be secured in place through the use of heat as above set forth. Likewise where threads impregnated with the solution of rubber latex and emulsified rubber hydrochloride are gathered into shape before drying they will adhere as they dry and thus retain the desired shape into which they are formed prior to drying. If they are first dried and then formed into a cushion they may be secured to one another through the application of heat as above described and thus retain the desired shape of cushion.

With coated or impregnated sissal and other fibres the various tubes of Figs. 11 through 12 and the sheets of Figs. 13 and 14 may be glued or cemented together instead of being fused as first described. For this purpose the sissal and the like may be coated with rubber latex or other adhesive latices and then shaped as about a bar and then when the tubes are stripped from the forms and pressed together they stick at the points of contact.

For an inexpensive cushion plain sissal—not impregnated with any of the various impregnating agents mentioned, may be used. The sissal or the like in such instance is coated with latex and then shaped, as into tubes, and then the tubes are assembled into a pad or cushion. The latex secures the sissal or other natural fibres in the desired form or shape, as tubes, and also secures the elements, the tubes or the like, to one another in the assembled cushion. In making these tubes as the coated sissal or the like is bent about the desired form the edges or overlapping portions of the material being formed adhere because of the latex and the use of heat or other means for securing the material in the form of tubes or other shapes is unnecessary.

To avoid the use of heat in securing the threads in place when making a cushion of threads of a thermo-plastic material latex may be used. In such an instance the threads of vinylidene chloride are coated with rubber latex or the emulsion mentioned above and then gathered into the desired shape. This shaping of the cushion from the threads is accomplished before the coating has dried and as it dries it causes the threads to adhere.

When the threads used in making the cushion are of a plastic material having a quick acting and inexpensive chemical solvent the latter may be used in fusing the threads together and thus the use of heat avoided. In such instances the solvent is applied at the desired places and as the solvent softens the threads (or the sheet 17) the softened portions are kept in contact and when the solvent dries adhering or welding of the threads at the desired places has been accomplished. Through the use of this method the adhesive 32 of Fig. 7 may be dispensed with.

The pads or cushions of the invention are easily cleaned. The threads forming the pads are of a water-proof material or are treated to render them waterproof and thus any covers used on the pads may be removed, the pads may be washed as by spraying with a hose, dipping or the like. Since the threads are of a water-proof material or have been water proofed and will not absorb water they will rapidly dry and be ready for reuse. In the following claims the word "cushion" is used to denote a pad, a cushion such as a chair cushion, padding for upholstery, for bed mattresses, car, bus and theatre seats, boat cushions, hammocks, gliders, and other furniture. It is to be understood that organic chlorides such as the vinylidene chloride, chlorinated rubber, rubber hydrochloride, polychloroprene, naphthalene chloride, and the copolymer of vinyl chloride and vinyl acetate all contain the chlorine radical which may be released on heating.

Thus any of the various structures of the drawings may be made of threads of any of these materials where such is practical or of other fibres impregnated or coated with these materials as above described.

In fact while most of the materials herein named are polymers it will be understood that the monomers of the corresponding polymers may be used with slight changes in procedure. Thus where a structure is formed of a monomeric material the material may thereafter be converted to a polymer as by the use of ultra-violet light, heat, catalyst, mixtures of other materials, etc., depending on the particular material being converted.

Having thus set forth the nature of our invention, what we claim is:

1. In a cushion, a compressible and expansible cushioning body, said body comprising a shaped pad of resilient fibres of a synthetic thermoplastic material, said pad of substantial thickness and said fibres in substantially uniform proximity throughout said pad whereby the latter is of substantially uniform density, said fibres being fused to one another in restricted zones extending through spaced portions of said pad whereby the latter is tufted, and said fibres between said zones being loosely related for relative movements as the pad is compressed and expanded under weight and when the weight is released.

2. In a cushion, a compressible and expansible cushioning body, said body comprising a shaped pad of resilient fibres of a synthetic thermoplastic material, said fibres being in substantially uniform proximity throughout said pad whereby the latter is of substantially uniform density, said fibres being fused to one another in spaced restricted zones extending through the pad whereby the latter is tufted, said fibres between said zones being loosely related for relative movements as the pad is compressed and expanded under weight and when the weight is released, and said fibres in their portions at a surface of said pad fused to on another whereby said surface is partly sealed and the fibre ends at said surface are united.

3. The method of making a compressible and expansible cushion body comprising selecting a mass of fibres of a synthetic thermo-plastic material, forming said fibres into a shaped pad with said fibres in substantially uniform proximity throughout the pad and relatively movable therein whereby the pad is compressible and expansible, and then tufting said pad by passing heated needle-like members through the same at spaced points inwardly of the edges of the pad.

4. The method of making a compressible and expansible cushion body comprising selecting a mass of fibres of a synthetic plastic material, forming said mass of fibres into a cushion pad of the desired shape and with the fibres in substantially uniform proximity throughout said pad and relatively movable therein, softening said fibres only in limited zones extending through said pad inwardly of the edges thereof to render said fibres in said zones mutually adhesive, and then permitting the softened fibres in said zones to reset in adhered relation whereby the pad is tufted and its fibres not in said zones are left relatively movable.

WALTER B. LASHAR.
RICHARD F. WARREN, Jr.